July 4, 1950  J. E. LODGE  2,513,808
MOLDING APPARATUS

Filed Feb. 12, 1946  2 Sheets-Sheet 1

INVENTOR
J. E. LODGE
BY [signature]
ATTORNEY

INVENTOR
J.E. LODGE
ATTORNEY

Patented July 4, 1950

2,513,808

UNITED STATES PATENT OFFICE 2,513,808

MOLDING APPARATUS

Joseph E. Lodge, Baltimore, Md., assignor to Western Electric Company, Incorporated, New York, N. Y., a corporation of New York Application February 12, 1946, Serial No. 647,148

7 Claims. (Cl. 18—30)

This invention relates to molding apparatus and more particularly to apparatus for molding insulating material around spliced conductive cores.

In some types of molding operations in which either transfer molding, injection molding or compression molding is performed, a mold is moved into the press for the molding operation and after the molding operation the mold is moved out of the press before the mold is opened. Such operations involve a considerable amount of time and much manual effort in moving the mold into and out of the press. This is especially true if the mold is heavy.

An object of the invention is to provide new and improved molding apparatus.

Another object of the invention is to provide molding apparatus in which a pressure-applying element may be swung into and out of alignment with a mold so that the mold may be opened without moving the entire mold into and out of molding position in the press.

In accordance with these objects, there is provided a molding apparatus having a stationary mold section. A movable mold section having an extrusion chamber therein is mounted for pivotal movement into and out of molding relationship with respect to the stationary mold section and may be pivoted to one side of the stationary mold section to expose the molding surfaces of the mold sections. A plunger for forcing plastic material from the extrusion chamber and means for actuating the plunger are mounted for pivotal movement between a position in which the plunger is aligned with the extrusion chamber and a position to one side of the stationary mold section. By this arrangement clearance is provided to permit the pivotally mounted mold section to be moved out of engagement with the stationary mold section.

A complete understanding of the invention may be obtained from the following detailed description of a molding apparatus forming a specific embodiment thereof, when read in conjunction with the appended drawings, in which.

Figure 1:
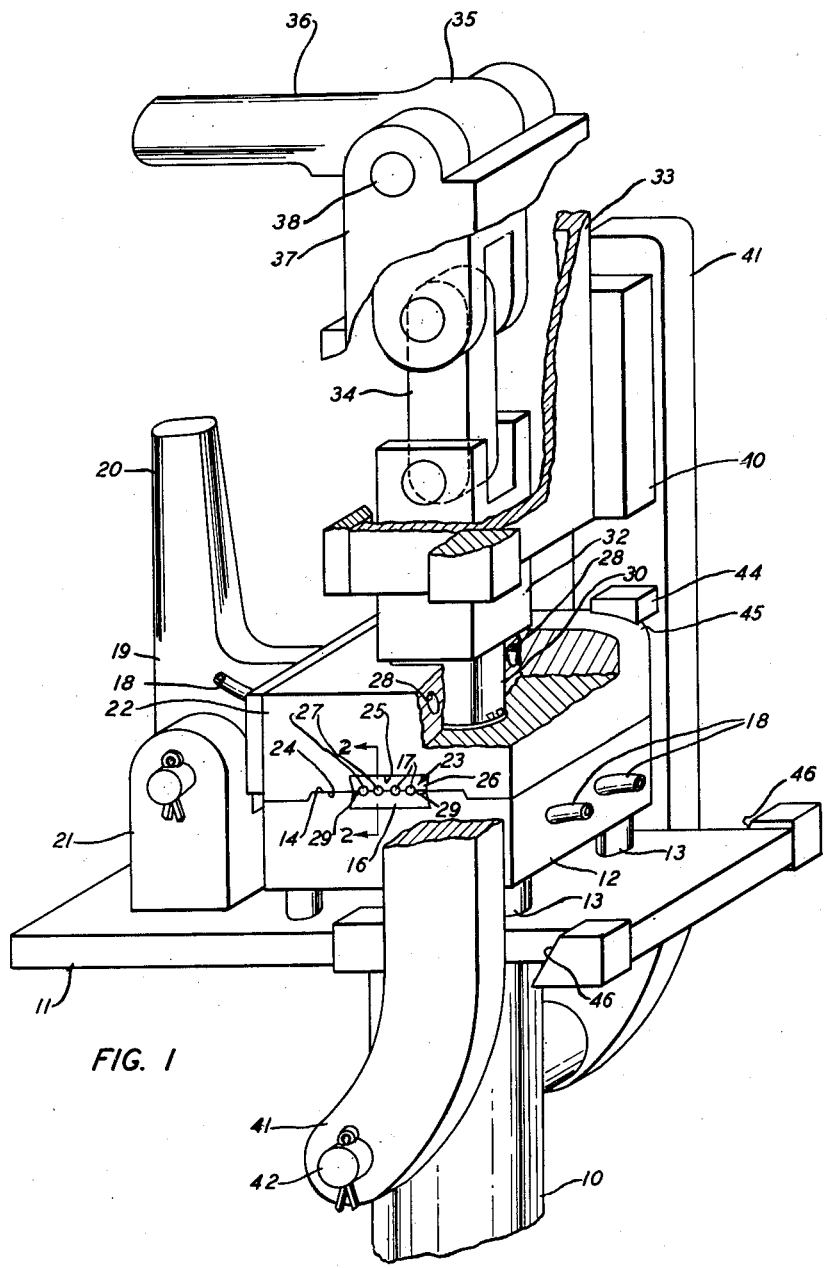
Fig. 1 is a fragmentary, oblique view of a molding apparatus constituting one embodiment of the invention.
Figure 2:
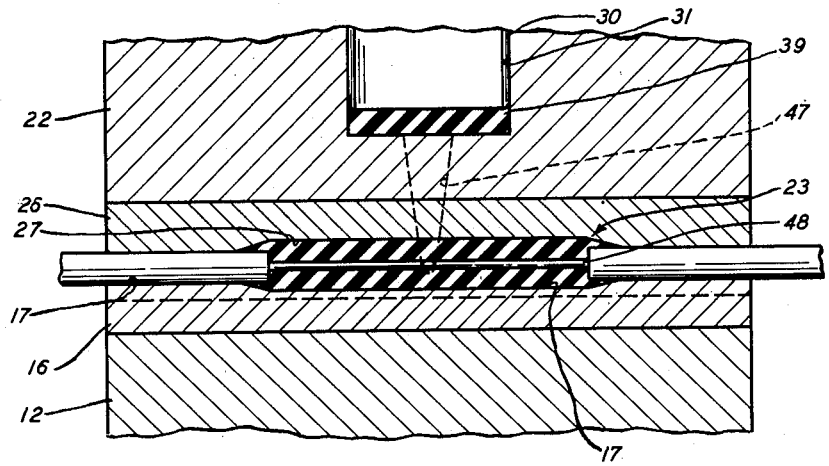
Fig. 2 is an enlarged, vertical section taken along line 2—2 of Fig. 1.

Referring now in detail to the drawings, there is shown therein a molding apparatus which includes a supporting column 10 (Fig. 1) on which a platen 11 is supported. A lower mold section 12 is mounted in a fixed position on the platen 11 by legs 13—13 and is provided with a tapered rib 14 and dovetail groove 15. A dovetail insert 16 having molding recesses 17—17 formed therein fits tightly within the dovetail groove formed in the lower mold section. Steam passages 18—18 formed in the lower mold section are designed to receive steam to heat the lower mold section and the dovetail insert 16.

A lever 19 having a handle 20 is pivotally supported by a bracket 21 and supports an upper mold section 22 on one end thereof. The upper mold section is provided with a tapered groove 24 which is complementary to the tapered rib 14 on the lower mold section 12. A dovetail groove 25 formed in the upper mold section fits tightly around a dovetail insert 26 having molding recesses 27—27 formed therein, which are complementary to the molding recesses 17—17 formed in the dovetail insert 16 and form cylindrical molding cavities 23—23 therewith. Steam is passed through steam passages 28—28 formed in the upper mold section to heat the upper mold section and the dovetail insert 26. Large overflow channels 29—29 are formed in the insert 16 beyond the outermost ones of the molding cavities 23—23.

An extrusion plunger 30 is designed to enter an extrusion chamber 31 formed in the upper mold section 22 when it is forced downwardly by a ram 32. The plunger 30 forces a plastic material 39, such as a vulcanizable rubber compound, from the extrusion chamber 31 in the upper mold section through sprues, of which a sprue 47 is shown, into the molding cavities 23—23 over spliced conductive cores, of which a conductive core 48 is shown. The area of the extruding end of the plunger is larger than the area between the overflow channels 29—29 in the mold sections. The ram 32 is slidably mounted in a guide 33 and is connected by a link 34 to a lever 35 having a handle 36. The lever 35 is pivotally mounted by a pintle 38 on a bracket 37 formed on the upper end of the guide.

When the lever 35 is moved in a clockwise direction, as viewed in the drawing, the ram 32 and the plunger 30 are moved upwardly through the link 34, and the plunger is lifted out of the extrusion chamber 31. When the plunger is positioned above the extrusion chamber, the lever 35 may be turned in a counterclockwise direction to move the ram 32 and the plunger downwardly and force the plunger into the extrusion chamber to force the plastic material 39 from the extrusion chamber through the sprues 47—47 into the molding cavities 23—23. The link 34 and the lever 35 form a toggle through which a very great force may be applied to the ram 32 and the plunger 30 by the application of a relatively small force to the handle 36 of the lever.

The guide 33 is fastened rigidly by spacers 40—40 to the upper ends of arms 41—41, which are mounted pivotally on the supporting column 10 by a pintle 42. When the arms 41—41 are in the positions in which they are shown in the drawing, they abut stops of which a stop 43 is shown. At this time, the guide 33, the ram 32 and the plunger 30 are in alignment with the extrusion chamber 31 in the upper mold section 22. Also, arcuate locking shoes, of which an arcuate locking shoe 44 is shown, carried by the arms 41—41 abut an arcuate surface 45 formed on the upper mold section concentrically with the pintle 42.

When the lever 35 is swung in a clockwise direction, as viewed in the drawing, so that the plunger 30 is lifted out of the extrusion chamber 31 and is raised completely above the upper mold section, the arms 41—41 may be swung in a clockwise direction to positions abutting stops 46—46 secured to the platen 11, and the locking shoes 44—44 slide off of the arcuate surface 45 formed on the upper mold section. When the arms 41—41 are in positions, abutting the stops 46—46, the plunger 30, the ram 32 and the guide 33 provide clearance for the upper mold section so that the handle 20 of the lever 19 may be clasped and the upper mold section may be swung in a counterclockwise direction to open the mold sections. The upper mold section 22 may be swung slightly over 90° before the lever 19 strikes the platen 11 so that the upper mold section acts as an overcenter counterweight in holding itself in an open position.

When the upper mold section 22 is moved back into engagement with the lower mold section 12, the tapered rib 14 on the lower mold section enters the tapered groove 24 in the upper mold section, which aligns the molding recesses 27—27 with respect to the molding recesses 17—17. Since the rib 14 and the groove 24 are tapered, they do not interfere with the movement of the upper mold section into and out of engagement with the lower mold section.

In the operation of the molding apparatus described hereinabove, when the arms 41—41 are resting against the stops 46—46 and the upper mold section 22 in its open position relative to the lower mold section 12, conductive cores (not shown) are placed in the molding recesses 17—17. The handle 20 then is clasped and the upper mold section is swung into engagement with the lower mold section and is aligned with respect thereto by the action of the tapered rib 14 and the tapered groove 24.

The extrusion chamber 31 in the upper mold section 22 then is charged with molding material such as a vulcanizable rubber or a rubberlike insulating compound, and the heat from the steam passing through the passages 28—28 in the upper mold section heats the molding material. The arms 41—41 then are swung out of engagement with the stops 46—46 and into engagement with the stops 43—43, this moves the plunger 30, the ram 32 and the guide 33 into alignment with the extrusion chamber 31. The locking shoes 44—44 then are in such positions that the mold sections 12 and 22 are locked together. The lever 35 then is turned to force the plunger 30 downwardly with great force into the extrusion chamber 31. This forces the molding material from the extrusion chamber through sprues 47—47 into the molding cavities 23—23. During this operation the locking shoes 44—44 positively prevent the mold sections from being separated by the pressure of the molding material on the inserts 16 and 26.

The heat in the mold sections 12 and 22 cures the molding material after which the plunger 30 is withdrawn from the extrusion chamber. The arms 41—41 are moved back into engagement with the stops 46—46 to provide clearance for the upper mold section and the lever 19 is pivoted in a counterclockwise direction to open the mold sections. The molded article then may be removed from the molding cavities 23—23 and the operation described hereinabove may be repeated.

The molding apparatus described hereinabove is simple and durable in construction and is very easy to operate. Very high extruding pressures may be created by a small force applied to the handle 36 of the lever 35. The mold sections 12 and 22 may be opened merely by moving the arms 41—41 into engagement with the stops 46—46 and swinging the upper mold section 22 to an open position with the aid of the lever 19. Thus, an operator of this molding apparatus need not change his position throughout the entire cycle of molding. In addition to these advantages, the molding apparatus occupies a relatively small space even when it is open, and the upper mold section 22 is positioned out of the way of loading and unloading operations on the lower mold section 12 without carrying the upper mold section to some suitable support.

A molding apparatus (Fig. 3) constituting an alternative embodiment of the invention is designed to mold and vulcanize jacketing material 107 around a plurality of spliced insulated conductors 108—108. This molding apparatus includes a stationary lower mold section 112 having a molding recess 117 formed therein. A lever 119 having a handle 120 pivotally mounted by a bracket 121 carries an upper mold section 122 having a molding recess 127 formed therein. The lever may be swung in a clockwise direction, as viewed in Fig. 3, to open the mold sections 112 and 122, and the latter mold section acts as an overcenter counterweight to remain in either an open or a closed position. Steam in steam passages 128—128 heat the mold sections 112 and 122. These mold sections also are provided with overflow channels 129—129.

An elongated cylinder 132 fastened to the upper mold section 122 is provided with an elongated cylindrical extrusion chamber 131 designed to receive a cylindrical plunger 130. The plunger 130 is mounted on a piston rod 134 of a hydraulic actuating mechanism 135, which is supplied with an actuating fluid through flexible hoses illustrated by a flexible hose 136. The actuating mechanism is carried by an end of a C-frame 141 mounted pivotally at its other end by a pintle 142. The C-frame is mounted pivotally between stops 143 and 146. A heating coil 148 serves to heat the cylinder 132. The mold sections 112 and 122 may be locked together by suitable means (not shown) while the material 107 is being extruded.

The plunger 130 is provided with a plurality of dovetail grooves 150—150 extending across the face thereof. When the plunger is forced into the extrusion chamber 131 in the upper mold section 122, the jacketing material 107 enters the dovetail grooves, and when the jacketing material in the mold cavities is vulcanized, that in the dovetail grooves also is vulcanized. Hence, when the plunger 130 is lifted from the extrusion chamber 131, the residue of the plastic material in the extrusion chamber and sprues 138—138 is lifted by the plunger out of the sprues and the extrusion chamber. This residue may then be disengaged from the plunger 30 to free it for another molding operation.

Figure 3:
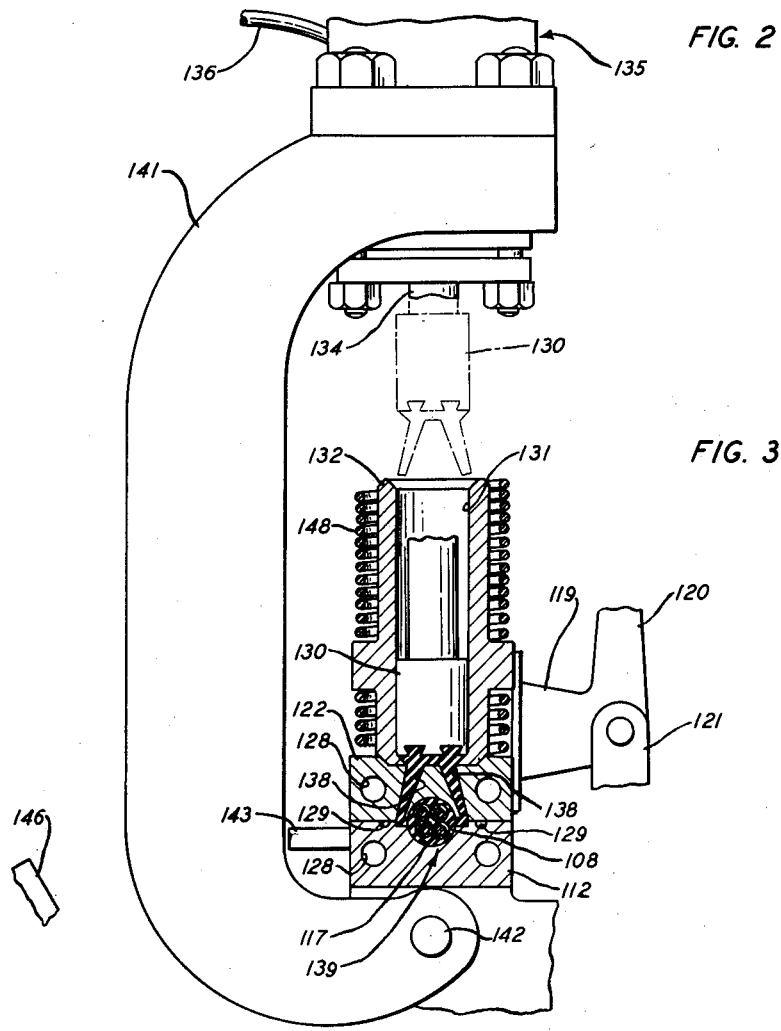
Fig. 3 is a fragmentary, vertical section of a molding apparatus constituting a second embodiment of the invention.

In the operation of the molding apparatus shown in Fig. 3, the spliced insulated conductors 108—108 are placed in the molding recess 117 formed in the lower mold section 112, the mold section is swung from its open position to its closed position, and the jacketing material 107 is placed in the extrusion chamber 131 in the elongated cylinder 132.

The C-frame then is moved from the stop 146 to the stop 143 to align the plunger 130 with the extrusion chamber 131, and the mold sections 112 and 122 are locked together. The hydraulic actuating mechanism 135 is operated to force the stripper and the plunger 130 downwardly, and the plunger 130 enters the extrusion chamber 131 and forces the jacketing material 107 through the opposed sprues 138—138 into a molding cavity 139 formed by the molding recesses 117 and 127 to fill the molding cavity. Heat imparted to the jacketing material from the heated mold sections 112 and 122 and the pressure imparted thereto by the plunger 130 vulcanize the jacketing material over the insulated conductors 108—108.

The hydraulic actuating mechanism 135 then is operated to withdraw the plunger 130 from the cylinder 132. This also withdraws the residue of the jacketing material 107 from the elongated extrusion chamber 131 so that it need not be cleaned. The C-frame 141 is swung to a position against the stop 146 so that clearance is provided to open the mold sections 112 and 122, and the mold sections are unlocked. The mold section 122 is swung to its open position, and the molded article is removed. The above-described operation then may be repeated to mold a jacket over other conductors similar to the conductors 108—108.

The last-described molding apparatus molds elongated jackets over spliced insulated conductors illustrated by the spliced insulated conductors 108—108 under high pressure. It occupies a relatively small space and is very simple and convenient to operate in all stages of its molding cycle. No trouble is involved in removing the residue of the jacketing material from the sprues 138—138 and the elongated extrusion chamber 131 because the plunger 130 withdraws the jacketing material therefrom when it is drawn out of the extrusion chamber 131.

What is claimed is:

1. A molding apparatus, which comprises a pair of separable mold sections, means for moving one of the mold sections along a predetermined path to separate the mold sections, a ram, means for actuating the ram, and pivotally mounted means for swinging the ram and the ram-actuating means out of the path of the last-mentioned mold section to provide clearance for that mold section, said pivotally mounted means including means exclusive of the ram for locking the mold sections together.

2. A molding apparatus, which comprises a stationary platen, a stationary mold section having a molding recess formed therein and mounted on the platen, a movable mold section having formed therein a molding recess for forming a molding cavity with the molding recess in the stationary mold section, a bracket mounted on the platen at one side of the stationary mold section, a lever pivotally mounted on the bracket for swinging the movable mold section away from the stationary mold section, pressing means, pivotal means for supporting the pressing means, and means for limiting the movement of the pivotal means between a position in which the pressing means is over the stationary mold section and a position in which the pressing means is at the side of the stationary mold section opposite to that at which the bracket is mounted.

3. A molding apparatus, which comprises a stationary platen, a stationary mold section having a molding recess formed therein and mounted on the platen, a movable mold section having formed therein a molding recess for forming a molding cavity with the molding recess in the stationary mold section, a bracket mounted on the platen at one side of the stationary mold section, a lever pivotally mounted on the bracket for swinging the movable mold section away from the stationary mold section, manually operable pressing means, a pair of pivotally mounted L-shaped arms for supporting the pressing means, and means for limiting the movement of the arms between positions in which the pressing means is over the stationary mold section and positions in which the pressing means is at the side of the stationary mold section opposite to that at which the bracket is mounted.

4. A molding apparatus, which comprises a stationary platen, a stationary mold section having a tapered rib and a molding recess formed therein and mounted on the platen, a movable mold section having formed therein a tapered groove complementary to the tapered rib in the stationary mold section and a molding recess for forming a molding cavity with the molding recess in the stationary mold section, said movable mold section having arcuate tracks formed thereon, a bracket mounted on the platen at one side of the stationary mold section, a lever pivotally mounted on the bracket for swinging the movable mold section away from the stationary mold section, pressing means including a manually operable toggle, a pair of pivotally mounted arms for supporting the pressing means, means for limiting the movement of the pivotally mounted arms between positions in which the pressing means is over the stationary mold section and positions in which the pressing means is at the side of the stationary mold section opposite to that of which the bracket is mounted, and a pair of arcuate locking shoes carried by the arms for engaging the arcuate tracks to lock the mold sections together.

5. A molding apparatus, which comprises a stationary mold section having a molding recess formed therein, a movable mold section mounted for pivotal movement with respect to the stationary mold section and provided with a molding recess complementary to the molding recess in the stationary mold section to form a molding cavity therewith, fluid pressure actuated means for applying pressure to molding material in the molding cavity, and means for mounting the fluid pressure actuated means for pivotal movement with respect to the mold sections to provide clearance for the pivotal movement of the movable mold section.

6. A molding apparatus, which comprises a stationary mold section having a molding recess formed therein, a movable mold section having a molding recess formed therein for forming a molding cavity with the molding recess in the stationary mold section and also provided with a plurality of sprues, an elongated member having an elongated extrusion chamber in communication with the sprues in the movable mold section, a plunger, fluid pressure actuated means for forcing the plunger into the extrusion chamber, and means for moving the fluid pressure actuated means and the plunger to one side of the mold sections and the elongated member to provide clearance for opening the mold sections.

7. A molding apparatus, which comprises a stationary mold section having a molding recess formed therein, a movable mold section having formed therein a molding recess for forming a molding cavity with the molding recess in the stationary mold section, said movable mold section also being provided with an extrusion chamber and a plurality of sprues, means for pivoting the movable mold section to an open position at one side of the stationary mold section, a plunger, a hydraulic mechanism for forcing the plunger into the extrusion chamber in the movable mold section, and a C-frame mounted for pivotal movement about one end thereof for supporting the plunger and the hydraulic mechanism, said C-frame being pivotal to the opposite side of the stationary mold section from that to which the movable mold section may be pivoted so that clearance is provided for the movement of the movable mold section.

JOSEPH E. LODGE.

REFERENCES CITED

The following references are of record in the file of this patent:

UNITED STATES PATENTS

| Number | Name | Date |
| --- | --- | --- |
| 216,250 | Winderling | June 3, 1879 |
| 340,555 | Cardona | Apr. 27, 1886 |
| 349,664 | Rodwell | Sept. 21, 1886 |
| 753,951 | Anderson | Mar. 8, 1904 |
| 1,028,852 | Battenfeld | June 11, 1912 |
| 2,331,963 | Da Cunha | Oct. 19, 1943 |
| 2,407,683 | Prentice | Sept. 17, 1946 |
| 2,428,275 | Frankuick et al. | Sept. 30, 1947 |

FOREIGN PATENTS

| Number | Country | Date |
| --- | --- | --- |
| 651,725 | Germany | Oct. 18, 1937 |